(12) United States Patent
Tooley et al.

(10) Patent No.: US 7,202,869 B2
(45) Date of Patent: Apr. 10, 2007

(54) SYSTEM AND METHOD OF CREATING AND ANIMATING A COMPUTER-GENERATED IMAGE OF A CREATURE

(75) Inventors: James Robert Tooley, Novato, CA (US); Cary Phillips, Moss Beach, CA (US); Nicolas Popravka, San Rafael, CA (US); John Anderson, San Anselmo, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 348 days.

(21) Appl. No.: 10/338,416

(22) Filed: Jan. 7, 2003

(65) Prior Publication Data

US 2006/0033740 A1 Feb. 16, 2006

(51) Int. Cl.
*G06T 15/70* (2006.01)

(52) U.S. Cl. ........................ 345/473; 345/474; 345/475

(58) Field of Classification Search ......... 345/473–475
See application file for complete search history.

(56) References Cited

U.S. PATENT DOCUMENTS

| | | | | |
|---|---|---|---|---|
| 4,600,919 A | * | 7/1986 | Stern | 345/473 |
| 5,883,638 A | * | 3/1999 | Rouet et al. | 345/473 |
| 6,025,852 A | * | 2/2000 | Zhao | 345/474 |
| 6,191,798 B1 | * | 2/2001 | Handelman et al. | 345/473 |
| 6,317,132 B1 | * | 11/2001 | Perlin | 345/475 |
| 6,400,368 B1 | * | 6/2002 | Laperriere | 345/473 |
| 6,552,729 B1 | * | 4/2003 | Di Bernardo et al. | 345/473 |
| 6,738,065 B1 | * | 5/2004 | Even-Zohar | 345/473 |
| 6,798,416 B2 | * | 9/2004 | Lanciault | 345/474 |
| 2003/0085900 A1 | * | 5/2003 | Isner | 345/473 |
| 2004/0021660 A1 | * | 2/2004 | Ng-Thow-Hing et al. | 345/419 |
| 2004/0257368 A1 | * | 12/2004 | Anderson | 345/473 |
| 2004/0263518 A1 | * | 12/2004 | Anderson | 345/473 |
| 2005/0007370 A1 | * | 1/2005 | Hunter et al. | 345/473 |
| 2005/0030310 A1 | * | 2/2005 | Hunter et al. | 345/473 |
| 2005/0041030 A1 | * | 2/2005 | Isner | 345/473 |
| 2005/0253846 A1 | * | 11/2005 | Russ et al. | 345/473 |

OTHER PUBLICATIONS

Zhao et al., "Inverse Kinematics Positioning Using Nonlinear Programming for Highly Articulated Figures", ACM Transactions on Graphics, vol. 13, No. 4, Oct. 1994, pp. 313-336.*
Witkin et al., "Spacetime Constraints", ACM SIGGRAPH 88, Computer Graphics, vol. 22, No. 4, Aug. 1988, pp. 159-168.*

(Continued)

*Primary Examiner*—Ulka Chauhan
*Assistant Examiner*—Roberta Prendergast
(74) *Attorney, Agent, or Firm*—Fish & Richardson P.C.

(57) ABSTRACT

A to-be-animated creature is set up by creating a rig, defining connection points on the rig, and associating geometry with the rig via the connection points. The set up creature is then animated by moving the creature with user defined actions which move a part of the rig. When one part of the rig moves, the remaining parts follow.

24 Claims, 6 Drawing Sheets

OTHER PUBLICATIONS

Witkin et al., "Fast Animation and Control of Nonrigid Structures", ACM SIGGRAPH 90, Computer Graphics, vol. 24, No. 4, Aug. 1990, pp. 243-252.*

Chadwick et al., "Layered Construction for Deformable Animated Characters", ACM SIGGRAPH 89, Computer Graphics, vol. 23, No. 3, Jul. 1989.*

Anderson, Frank C., "Static and Dynamic Optimization Solutions for Gait are Practically Equivalent",Journal of Biomechanics, 2001, vol. 34. pp. 153-161.*

Grassia. F. Sebastian, "Practical parameterization of Rotations Using the Exponential Map", Journal of Graphics Tools, vol. 3, No. 3, 1998, pp. 29-48, A.K. Peters Ltd.*

Maciel, Anderson, et al. "Anatomy-based Joint Models for Virtual Humans Skeletons", In Proceedings of Computer Animation (2002), pp. 220-224.*

Andrew Witkin, Michael Gleicher and William Welch, "In teractive Dynamics", Computer Graphics, V.24(2), Proceedings of the 1990 Symposium on the 3-D Interactive Graphics, Mar. 1990, pp. 11-21.

Michael L. Gleicher, "A Differential Approach to Graphical Interaction", Thesis Committee, School of Computer Science, Carnegie Mellon University, Nov. 18, 1994, pp. 1-250, Chapters 1, 6, 7, 8 & 9 most relevant.

* cited by examiner

SYSTEM AND METHOD OF CREATING AND ANIMATING A COMPUTER-GENERATED IMAGE OF A CREATURE

BACKGROUND OF THE INVENTION

1. Field of the Invention

The present invention relates to animation and, more particularly, to a system and method of creating and animating a computer-generated image of a creature.

2. Description of the Related Art

An animation sequence is a series of frames that illustrate a scene that changes over time. In one animation technique, selected frames from a to-be-created sequence, known as key frames, are identified by a lead animator. The lead animator then describes every object in the key frames. The key frames are then passed on to a junior animator to fill in the frames that lie in between the key frames. As a result, the work performed by the junior animator is often referred to as "in-betweening."

Computers are commonly used to assist in the animation process. One of the great promises of computer animation is that a lead animator can describe every object in the key frames, and the computer can then automatically perform the in-betweening. One of the problems with computer animation, in addition to a generally poor quality of in-betweening, is that it is generally quite difficult to create the key frames of the sequence.

For example, a humanoid creature is typically described with a hierarchical object model that includes a number of jointed polyhedral objects. The jointed objects of the creature can include, for example, the head, the neck, the chest, the stomach, the pelvis, the upper legs, the lower legs, the feet, the upper arms, the lower arms, and the hands.

The spatial relationship between two objects is described by translations, rotations, and other position-describing operators located at the joint between the two objects. Thus, to move one object (e.g., a leg) with respect to another object (e.g., a pelvis), the animator must change the translations, rotations, and other position-describing operators of the joint between the two objects.

For simple movements, such as to move the position of a forearm while keeping the position of the elbow fixed, modifying the position-describing operators is a straightforward task. However, for more complex movements, modifying the position-describing operators can become an extremely difficult task.

One of the reasons for this is the hierarchical nature of the object model. With a hierarchical object model, the movement of one object can cause a number of other objects to move. For example, the hip or chest objects move all of the remaining objects. On the other hand, the arm object moves the hand related objects but not the leg objects.

Thus, to specify the position of a humanoid creature in a new key frame, the animator must decide if only the arms need to be moved, the arms and the chest, or the arms, the chest, and the stomach, and so on. If the animator specifies a new position of the chest object, then specifies a new position of the arm object only to find out that the animator should have begun with the stomach object, the entire process must be repeated.

Thus, there is a need for a system and method of animating a computer-generated image of a creature that reduces the difficulties associated with posing a to-be-animated creature in a new key frame.

SUMMARY OF THE INVENTION

The present invention includes a method of animating an object, such as a creature. The method includes constructing a rig by forming a plurality of structures that represent a plurality of moving mass elements of the object so that each structure represents a moving mass element. Each structure has a plurality of constraints, where each constraint has ends and handles at the ends. In addition, constructing a rig also includes connecting the structures together to form the object so that to obtain a first type of movement between a first structure and a second structure, only one handle from the first structure and one handle from the second structure are connected together, and to obtain a second type of movement between the first and second structures, only two handles from the first structure and two handles from the second structure are connected together.

The present invention includes an apparatus for animating an object. The apparatus includes means for constructing a rig, wherein the means for constructing a rig includes means for forming a plurality of structures that represent a plurality of moving mass elements of the object so that each structure represents a moving mass element. Each structure has a plurality of constraints, while each constraint has ends and a handle at each end. The apparatus also includes means for connecting the structures together to form the creature so that to obtain a first type of movement between a first structure and a second structure, only one handle from the first structure and one handle from the second structure are connected together, and to obtain a second type of movement between the first and second structures, only two handles from the first structure and two handles from the second structure are connected together.

An embodiment of the invention also includes a method of determining a moved position of each of, a structure having handles and constraints. The method includes detecting when a handle has been moved by a user, and selecting a constraint after a handle has been moved by the user, the constraint having a first handle, a spaced apart second handle, and a rest length. The method also includes determining if a current length of the constraint is less than, equal to, or greater than the rest length of the constraint. When the current length is greater than the rest length, for the first handle of the constraint, a calculated motion vector is determined along the constraint towards the constraint with a magnitude equal to a fraction of the difference between the current length and the rest length.

The present invention further includes a method of determining a moved position of each of a plurality of handles that are associated with a plurality of constraints. Each handle has a current position, a summed motion vector, and a handle weight. Each constraint has a first handle, a second handle, a rest length, and a constraint length weight. The method includes identifying a user moved handle.

The method also includes setting the handle weight of the user moved handle to zero, and setting the summed motion vector of each handle to zero. The method further includes selecting a constraint, calculating a current length of the constraint, and determining a difference between the current and rest lengths of the constraint.

In addition, the method includes determining if the current length of the constraint is less than the rest length of the constraint and, when the current length is less, for the first handle of the constraint, determining a calculated motion vector along the constraint away from the constraint with a magnitude equal to a fraction of the difference between the current length and the rest length. Further, the method includes scaling the calculated motion vector by the length weight of the constraint to form a calculated and scaled motion vector, and adding the calculated and scaled motion vector to the summed motion vector of the first handle. The method also includes reversing and adding the calculated and scaled motion vector to the summed motion vector of the second handle of the constraint.

An embodiment of the present invention also includes a method of animating an object. The method includes forming a rig that represents the object to be animated. The rig has a first structure and a second structure. The first structure represents a first element of the object, and has a first number of sticks. The second structure represents a second element of the object, and has a second number of sticks. A first stick of the first structure and a first stick of the second structure are connected to a first handle. A second stick of the first structure and a second stick of the second structure are connected to a second handle. The first and second handles are spaced apart. The first and second structures share a common stick that is connected to the first and second handles. The first and second sticks of the first structure are movable with respect to the first and second sticks of the second structure about the first and second handles.

The invention also includes an apparatus for determining a moved position of each of a plurality of handles that are associated with a plurality of constraints. Each handle has a current position, a summed motion vector, and a handle weight. Each constraint has a first handle, a second handle, a rest length, and a constraint length weight. The apparatus includes means for identifying a user moved handle.

The apparatus also includes means for setting the handle weight of the user moved handle to zero, and means for setting the summed motion vector of each handle to zero. The apparatus additionally includes means for selecting a constraint, means for calculating a current length of the constraint, and means for determining a difference between the current and rest lengths of the constraint.

In addition, the apparatus includes means for determining if the current length of the constraint is less than the rest length of the constraint and, when the current length is less, for the first handle of the constraint, means for determining a calculated motion vector along the constraint away from the constraint with a magnitude equal to a fraction of the difference between the current length and the rest length.

Further, the apparatus includes means for scaling the calculated motion vector by the length weight of the constraint to form a calculated and scaled motion vector, and means for adding the calculated and scaled motion vector to the summed motion vector of the first handle. The apparatus also includes means for reversing and adding the calculated and scaled motion vector to the summed motion vector of the second handle of the constraint.

A better understanding of the features and advantages of the present invention will be obtained by reference to the following detailed description and accompanying drawings that set forth an illustrative embodiment in which the principles of the invention are utilized.

DETAILED DESCRIPTION OF THE INVENTION

Figure 1:
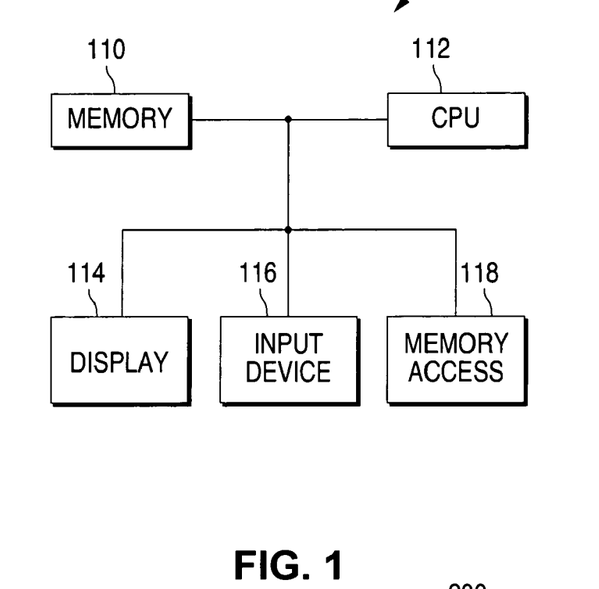
FIG. 1 is a block diagram illustrating a computer 100 in accordance with the present invention.

The present invention is a system and method of creating and animating a computer-generated image of a creature. The system includes a computer and software that is executed by the computer. FIG. 1 shows a block diagram that illustrates a computer 100 in accordance with the present invention.

As shown in FIG. 1, computer 100 includes a memory 110 that stores the software and data. The software includes an operating system and a set of program instructions. The operating system can be implemented with, for example, the Linux operating system, although other operating systems can alternately be used.

The program instructions can be written in, for example, C++ although other languages can alternately be used. In addition, as described in greater detail below, the data includes handle information, constraint information, hook information, geometry information, and movement information.

As further shown in FIG. 1, computer 100 also includes a central processing unit (CPU) 112 that is connected to memory 110. CPU 112, which can be implemented with, for example, a 32-bit processor, operates on the data in response to the program instructions. Although only one processor is described, the present invention can be implemented with multiple processors in parallel to increase the capacity to process large amounts of data.

In addition, computer 100 includes a display system 114 that is connected to CPU 112. Display system 114 displays images to the user which are necessary for the user to interact with the program. Computer 100 also includes a user-input device 116, such as a keyboard and a pointing device, e.g., a mouse, which is connected to CPU 112. The user operates input device 116 to interact with the program.

Further, computer 100 includes a memory access device 118, such as a disk drive or a networking card, which is connected to memory 110 and CPU 112. Memory access device 114 allows the processed data from memory 110 or CPU 112 to be transferred to an external medium, such as a disk or a networked computer. In addition, device 118 allows the program instructions to be transferred to memory 110 from the external medium.

Figure 2:
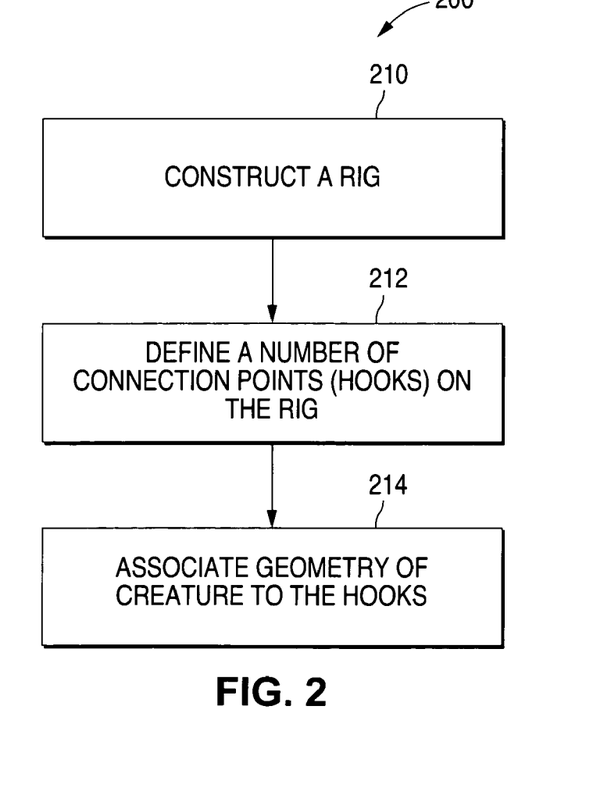
FIG. 2 is a flow chart illustrating an example of a method 200 of setting up a creature in accordance with the present invention.

The program instructions of the present invention include a set up mode of operation for setting up a creature, and a posing mode of operation for posing a set up creature. FIG.

2 shows a flow chart that illustrates an example of a method 200 of setting up a creature in accordance with the present invention. Method 200 can be executed on computer 100. As shown in FIG. 2, method 200 begins at step 210 by constructing a rig.

Figure 3:
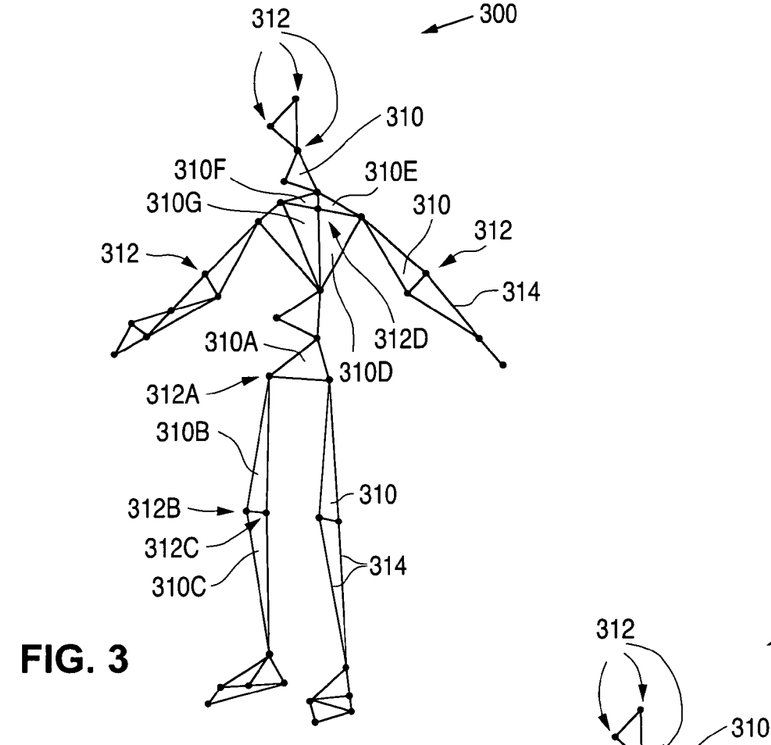
FIG. 3 is a perspective view illustrating an example of a rig 300 in accordance with the present invention.

FIG. 3 shows a perspective view that illustrates an example of a rig 300 in accordance with the present invention. In the example shown in FIG. 3, rig 300 is formed from a number of triangles 310 that define the major elements of a humanoid creature. Each triangle 310, in turn, includes three points 312, known as handles, and three sticks 314, known as constraints, that connect the three handles 312 together to form a triangle.

Adjacent triangles 310 are connected together by sharing handles 312, and the number of shared handles 312 determines the relative motion between triangles. For example, as shown in FIG. 3, triangles 310A and 310B share a single handle 312A which, in turn, allows a ball and socket type of rotation between triangles 310A and 310B. On the other hand, triangles 310B and 310C share two handles 312B and 312C which, in turn, allows a hinge type of rotation between triangles 310B and 310C.

A rigid structure can also be implemented by forming three or more triangles 310 where each handle 312 of the three or more triangles is shared by at least two triangles 310 of the three or more triangles, and one handle 312 is shared by each of the three or more triangles 310. For example, triangles 310D-310G form a rigid pyramid-type structure where each handle 312 is shared by two triangles, and handle 312D is shared by each of the triangles 310D–310G.

Figure 4:
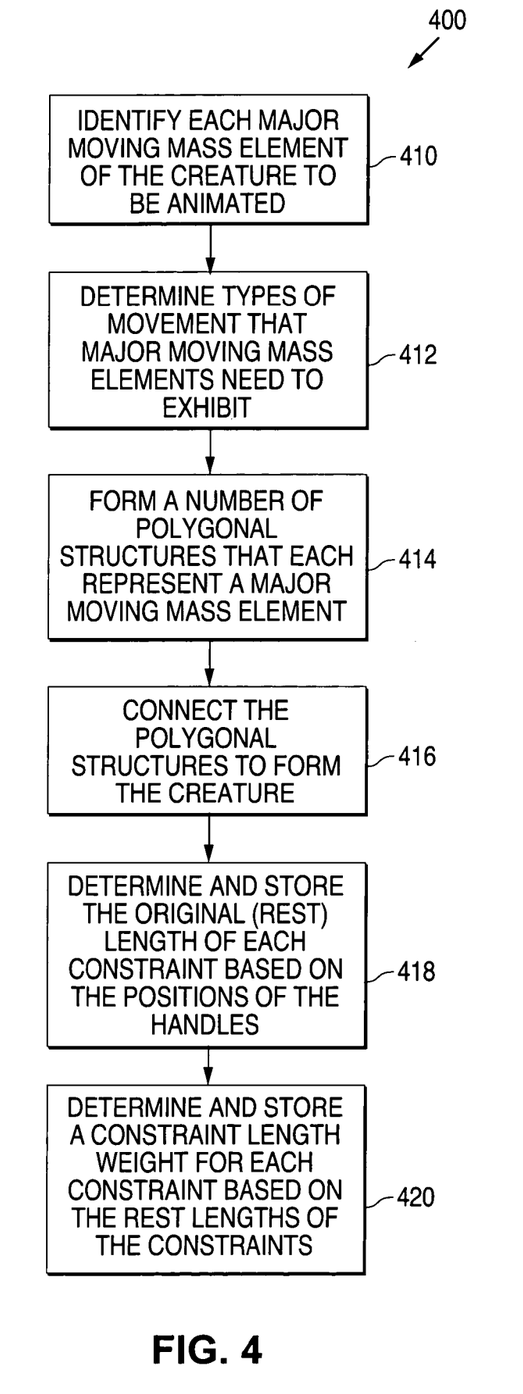
FIG. 4 is a flow chart illustrating a method 400 of constructing a rig (step 210) in accordance with the present invention.

FIG. 4 shows a flow chart that illustrates a method 400 of constructing a rig (step 210) in accordance with the present invention. As shown in FIG. 4, method 400 begins at step 410 by identifying each major moving mass element of the creature to be animated. If a humanoid creature is to be animated, the major moving mass elements of the creature can include, for example, the head, the neck, the chest, the stomach, the pelvis, the upper legs, the lower legs, the feet, the upper arms, the lower arms, and the hands.

Once the major moving mass elements have been identified, method 400 moves to step 412 to determine the types of movements that the major moving mass elements need to exhibit. For example, an upper leg of a humanoid creature may need to exhibit the rotational-type movement of ball and socket joint with respect to the pelvis, and the lower leg may need to exhibit the hinge-type movement of a knee with respect to the upper leg.

After the types of movements have been determined, method 400 moves to step 414 to form a number of polygonal structures that each represent a major moving mass element. A polygonal structure is formed by defining the locations of the constraints and handles of the structure.

The locations of the constraints are defined by selecting a coordinate position for a constraint 314 in a 3D (X, Y, and Z) global coordinate system, forming a constraint 314 in the coordinate system (including the definition of the type of constraint), and then positioning the constraint 314 within the coordinate system.

For example, with a windows-based interface, keystrokes or pull down menus can be used to select a transform. Once a transform has been selected, a constraint can be formed by selecting a line mode, placing a cursor over a first desired location, clicking and dragging the cursor to a second desired location, and unclicking to form the line (any of the well known techniques for forming a line can be used.)

In addition, the type of constraint and any limitations associated with the type are defined. The basic constraint is a stick that has a length that is not allowed to change during posing. Other constraints that can be selected include a stick with an initial length that can be stretched slightly (e.g., to 110% of the initial length) during posing, and rotational constraints that limit the amount of rotation that is available during posing.

After being initially defined, a constraint can be moved by clicking and dragging the stick that represents the constraint. In addition, the constraints can be shortened or lengthened by clicking and dragging an end of the stick. (Constraints can only be shortened and lengthened in this manner in the set up mode. In the posing mode, the length of a basic constraint is not allowed to change.) The constraint appears as a black (or other colored) line on display system 114.

Once a constraint has been defined, the handles are defined as the ends of the constraint. Further, keystrokes or pull down menus can be used to change the transform so the constraints and handles can be positioned in 3D space.

A number of constraints are formed so that a polygonal structure (a triangle or triangles) is formed to represent each major moving mass element of the creature. For example, as shown in FIG. 3, triangle 310A can be used to represent the pelvis, triangle 310B can be used to represent an upper leg, and triangle 310C can be used to represent a lower leg of the creature. On the other hand, triangles 310D–310G, which form the rigid pyramid-type structure, can be used to represent the chest of the creature.

Once the polygonal structures have been formed, method 400 moves to step 416 to connect the polygonal structures together to form the creature. The polygonal structures are connected together by associating a handle from a first polygonal structure with a handle from a second polygonal structure so that the first and second polygonal structures share a common handle.

Next, method 400 moves to step 418 to calculate and store the original (rest) length of each constraint based on the positions of the handles. Following this, method 400 moves to step 420 to determine and store a constraint length weight for each constraint based on the rest lengths of the constraints. To determine the constraint length weight, method 400 first determines which constraint has the longest length. The length of each remaining constraint is then divided by the length of the longest constraint to determine a value for that constraint.

For example, assume three constraints are present; constraint A, constraint B, and constraint C. Constraint A is the longest and has a constraint length of LA, constraint B is the shortest and has a constraint length LB, and constraint C is in between with a constraint length of LC. In this case, the constraint length weight of constraint A equals LA/LA, the constraint length weight of constraint B equals LB/LA, and the constraint length weight of constraint C equals LB/LC.

The constraint length weight adds stability when a creature is formed that has a handle with more than two constraints attached to the handle. For example, with complex sub-structures, such as pyramids, the handles have more than two constraints associated with them.

Referring again to FIG. 2, after a rig has been formed, method 200 moves to step 212 to define a number of connection points, known as hooks, for the polygonal structures of the rig that represent the major moving masses of the creature. A hook is a position in space that is defined by a triangle or a group of triangles. For example, the centroid of a triangle or a group of triangles can define a hook.

Each hook, in turn, defines the origin of a local coordinate system. The X, Y, and Z axes of the local coordinate system can have any orientation with respect to the global coordinate system. As a result, the three handles 312 that define triangle 310B have a location in the local hook coordinate system.

For example, a hook can be defined by taking two constraints from a triangle, normalizing the constraints, and then taking the cross product of the two normalized constraints. This forms a unit vector that is normal to both of the two constraints. The end of the unit vector then defines the origin of the coordinate system. Hooks can also be defined to be handles, or have other relationships with a triangle or triangles.

Referring again to FIG. 2, once a hook has been defined for the triangle or triangles that represent each major moving mass element, method 200 moves to step 214 to associate or connect the geometry of the creature to the hooks. The geometry of the creature is defined by, for example, a polygonal mesh structure that includes sub-mesh structures that represent each of the major moving mass elements of the creature. B-splines, non-uniform rational B-splines (NURBS), sub-division surfaces, and similar representations of objects can also be used.

Figure 5:
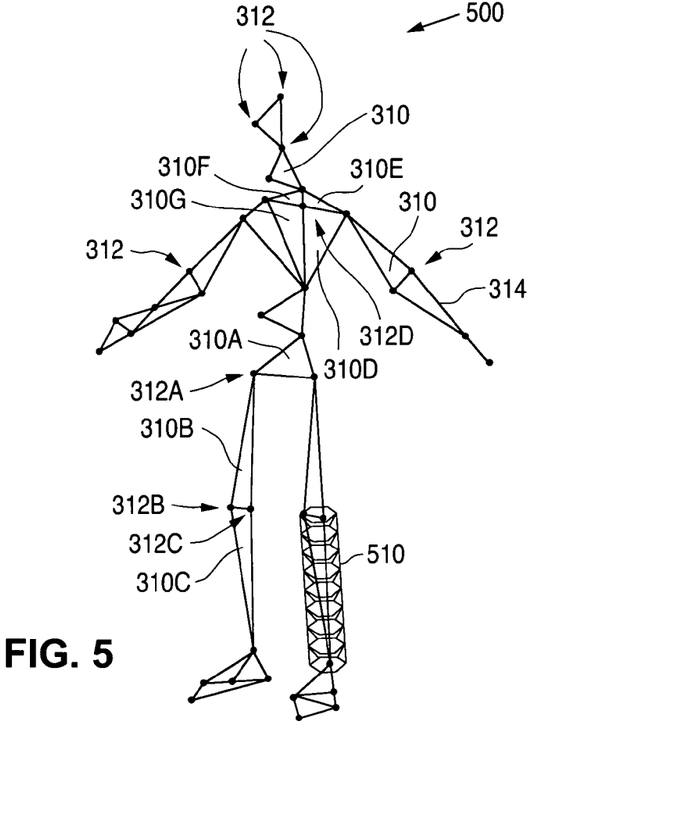
FIG. 5 is a perspective view illustrating an example of a partially set up rig 500 in accordance with the present invention.

FIG. 5 shows a perspective view that illustrates an example of a partially set up rig 500 in accordance with the present invention. Rig 500 is similar to rig 300 and, as a result, utilizes the same reference numerals to designate the structures which are common to both rigs. As shown in FIG. 5, rig 500 differs from rig 300 in that rig 500 includes a polygonal mesh structure 510 that represents the lower leg geometry of the creature.

The geometry of a major moving mass element, such as the polygonal mesh structure of the lower leg, is connected to the hook for triangle 310B by simultaneously associating the local coordinate position of each handle of triangle 310B with a point on the polygonal mesh structure. As a result, when the rig moves, the hooks move. When the hooks move, the geometries of the major moving mass elements move with the hooks.

Once the geometry of the creature has been attached to the hooks, the creature is set up and ready to be animated via the posing mode. For example, with a windows-based interface, keystrokes or pull down menus can be used to select the posing mode. When the posing mode is selected, the to-be-animated creature is displayed on display system 114.

In addition, the to-be-animated creature can be displayed in a first window, and a dope sheet can be displayed is a second window. A dope sheet is a set of instructions that, in a classical animation context, describe each frame of the animation. In the present invention, the dope sheet provides a memory location where the data from each frame of animation is stored.

Figure 6:
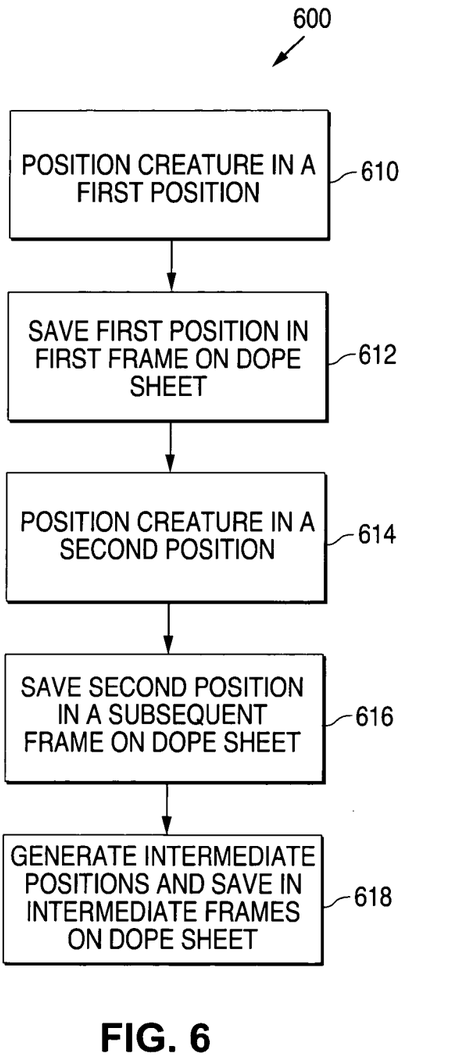
FIG. 6 is a flow chart illustrating an example of a method 600 of posing a creature in accordance with the present invention.

FIG. 6 shows a flow chart that illustrates an example of a method 600 of posing a creature in accordance with the present invention. As shown in FIG. 6, method 600 begins at step 610 by positioning the creature in a first position in 3D space. The creature can be moved to a first position by clicking and dragging the dots that represents the handles. When the dots are moved, the hooks associated with the handles and the geometries of the creature also move.

Once the creature has been placed in a first position in 3D space, method 600 moves to step 612 where the first position of the creature is saved as frame one of the dope sheet. Method 600 then moves to step 614 where the creature is moved to a second position in 3D space by clicking and dragging the dots that represent the handles.

Once the creature has been placed in the second position in 3D space, method 600 moves to step 616 where the second position of the creature is saved as a subsequent frame of the dope sheet such as, for example, frame eight. After the first and second positions have been saved, method 600 moves to step 618 to generate intermediate positions and save the intermediate positions in the intermediate frames of the dope sheet.

When the second position is stored in, for example, the eighth frame of the dope sheet, the content of frames two through seven are generated in a process known as "inbetweening" by defining, for each point that defines the image of the creature, a number of intermediate points between the location of the point at the first position and the location of the point at the second position.

The relative position of the same point between frames, in turn, is defined by the amount of time that elapses between the first frame and the eighth frame. For example, frames are typically shown at 24 frames per second. In one second, an object can move from point A to point B very slowly, or very quickly, and the relative speed defines the relative position of the same point from frame to frame.

As a result, the images stored in frames two through seven of the dope sheet are images that have positions that are in between the first and eighth positions. As noted above, the creature can be moved into a first or second position by clicking and dragging a handle to a new location. As the handle is moved to the new location, the remainder of the creature follows according to the movement allowed by the rig.

Figure 7A:
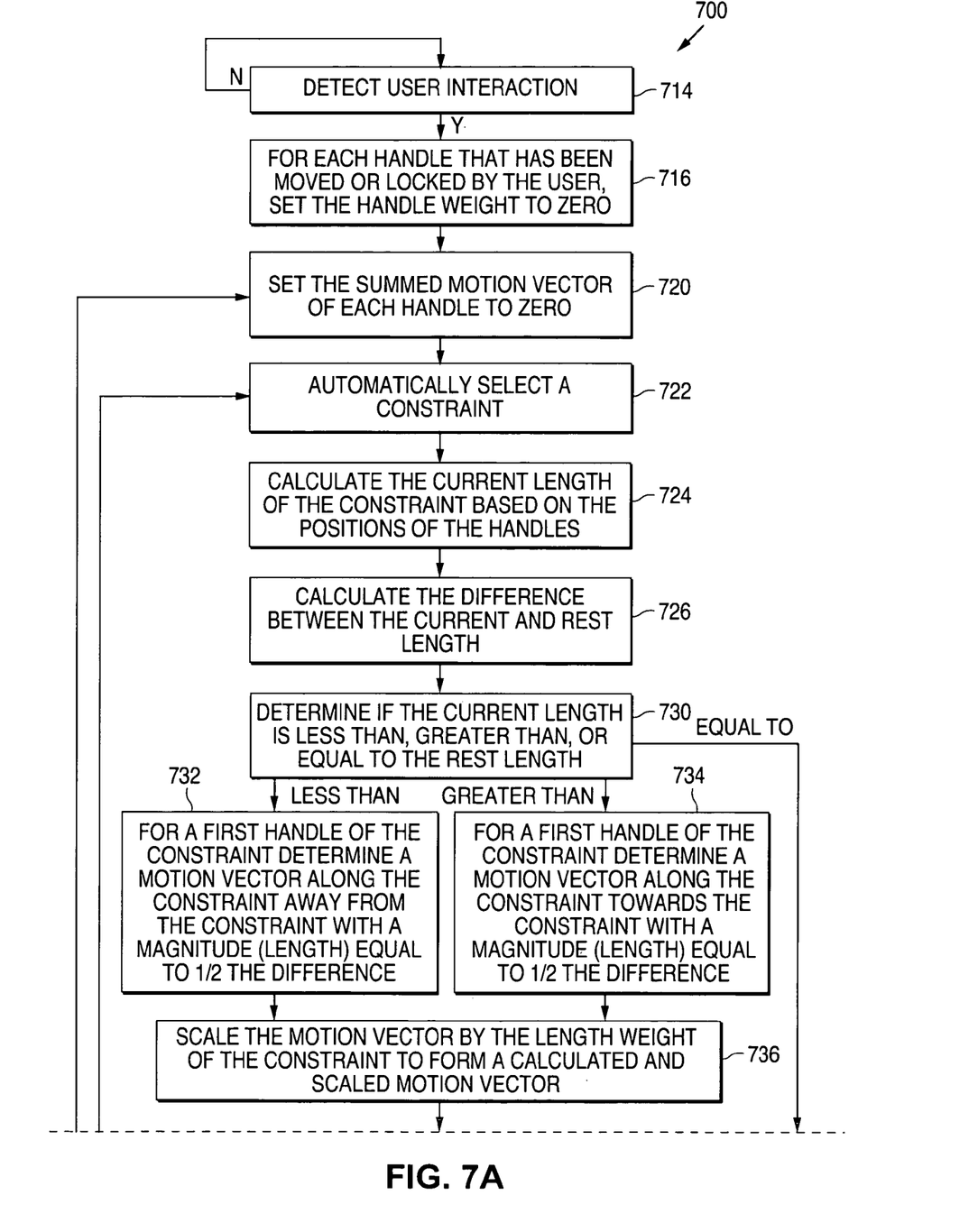
FIGS. 7A–7B are a flow chart illustrating an example of a method 700 of determining the positions of the remaining handles in 3D space when a handle is moved to a new position in accordance with the present invention.
Figure 7B:
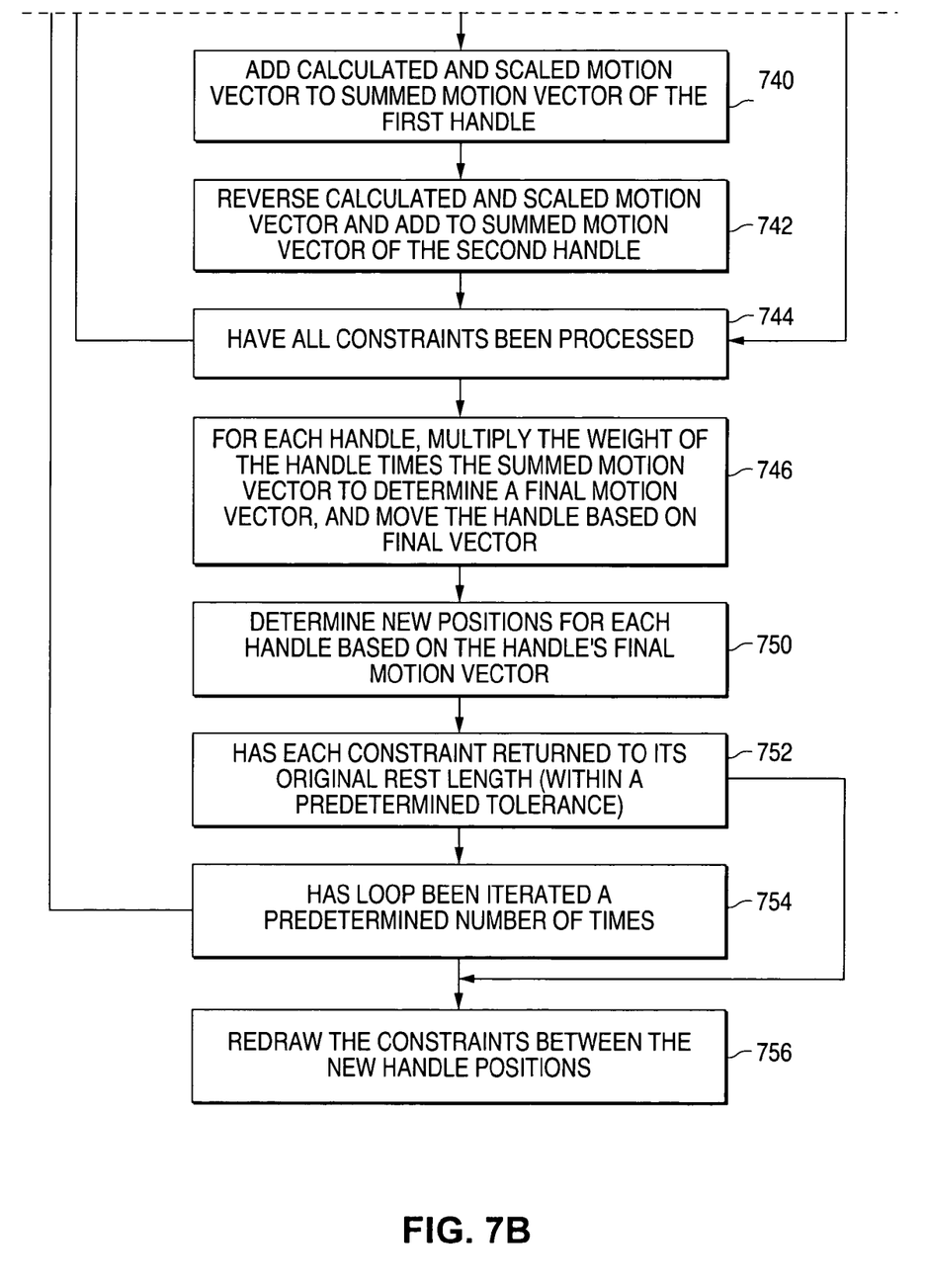

FIGS. 7A–7B show a flow chart that illustrates an example of a method 700 of determining the positions of the handles in 3D space after the handles have been moved in accordance with the present invention. Method 700 can be executed by computer 100. As shown in FIG. 7A, method 700 begins at step 714 by detecting if any user interaction has occurred, e.g., if any handles have been moved to a new position.

Figure 8A:
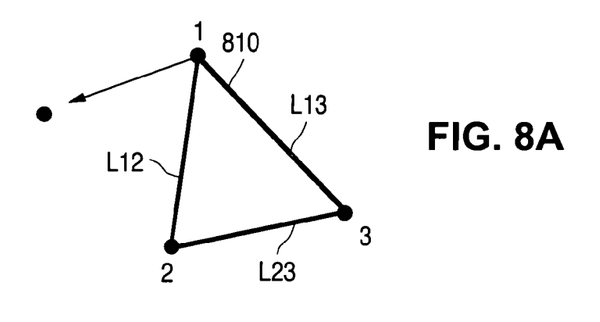
FIGS. 8A–8C are views illustrating an example of determining the positions of the remaining handles in 3D space when a handle in a triangle is moved to a new position in accordance with the present invention.
Figure 8B:
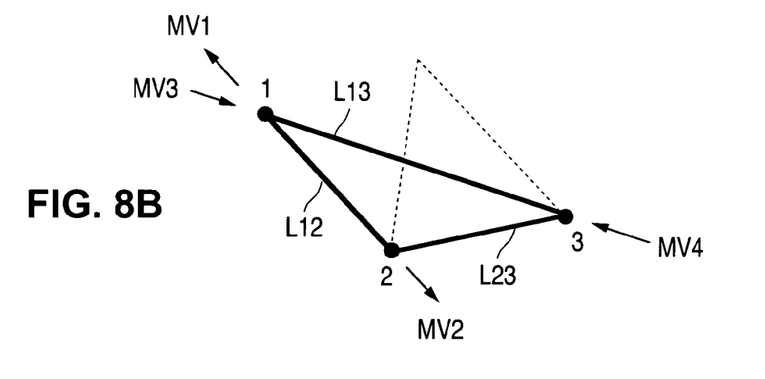
Figure 8C:
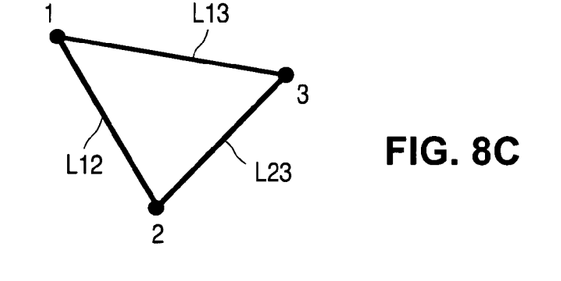

FIGS. 8A–8C show views that illustrate an example of the movement of a handle in accordance with the present invention. As shown in FIG. 8A, a triangle 810 includes handles 1, 2, and 3, and constraints L12, L13, and L23. In the example shown in FIG. 8A, handle 1 has been moved to a new position which, in turn, compresses constraint L12 and stretches constraint L13. The length of constraint L23 did not change.

Returning to FIG. 7A, once user interaction has been detected, method 700 moves to step 716. In step 716, for each handle that has been moved by the user, such as handle 1 in FIG. 8A, method 700 sets a handle weight of the handle to zero. The user can also designate (lock) other handles to have a weight of zero. Further, other weights, such as 0.5, can also be assigned to a handle depending on the desired movement of the creature.

Following this, method 700 moves to step 720. Each handle has a current position and a summed motion vector, and in step 720 method 700 sets the summed motion vector of each handle to zero. After this, method 700 moves to step 722 to automatically select a constraint, and then to step 724 to calculate the current length of the constraint based on the current positions of the handles. (As described in greater detail below, method 700 iteratively determines values for each constraint, and can use any method of selecting constraints that allows each constraint to be processed.)

Method 700 next moves to step 726 to determine the difference between the current and rest lengths of the constraint. Following this, method 700 moves to step 730 to determine if the current length of the constraint is less than, greater than, or equal to the rest length of the constraint.

When the current length is less, method 700 moves to step 732. In step 732, for a first handle of the constraint, a calculated motion vector is determined along the constraint away from the constraint with a magnitude (length) equal to ½ the difference between the current length and the rest length.

When the current length is greater than the original length of the constraint, method 700 instead moves to step 734. In step 734, for a first handle of the constraint, a calculated motion vector is determined along the constraint towards the constraint with a magnitude (length) equal to ½ the difference between the current length and the rest length.

Method 700 moves from step 732 or 734 to step 736 to scale the calculated motion vector by the length weight of the constraint. (Method 700 multiplies the length weight of the constraint times the calculated motion vector of the handle.) Following this, method 700 moves to step 740 to add the calculated and scaled motion vector to the summed motion vector of the first handle. After this, method 700 moves to step 742 where the calculated and scaled motion vector is reversed and added to the summed motion vector of the second handle of the constraint.

For example, as shown in FIG. 8B, when constraint L12 is evaluated, handle 1 receives a calculated motion vector MV1, while handle 2 receives a reversed calculated motion vector MV2. Motion vectors MV1 and MV2 point away from each other along the line of the current constraint. In addition, the magnitudes (lengths) of vectors MV1 and MV2 are each equal to one-half of the difference between the current length and the rest length of constraint L12.

Further, when constraint L13 is evaluated, handle 1 receives a calculated motion vector MV3, while handle 3 receives a reversed calculated motion vector MV4. Motion vectors MV3 and MV4 point towards each other along the line of constraint L13. In addition, the magnitudes of vectors MV3 and MV4 are each equal to one-half of the difference between the current length and the rest length of constraint L13. Further, since the length of constraint L23 did not change, handles 2 and 3, which are at opposite ends of constraint L23, receive no additional motion vectors when constraint L23 is evaluated.

Figure 9:
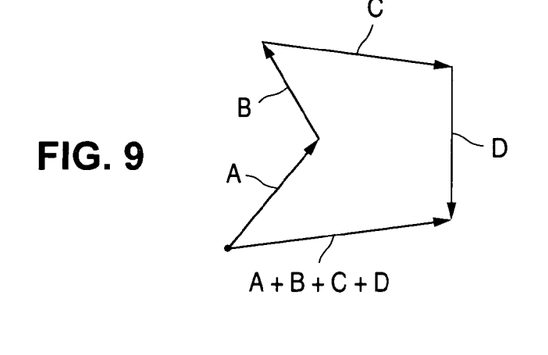
FIG. 9 is a graph illustrating the addition of a number of motion vectors in accordance with the present invention.

FIG. 9 shows a graph that illustrates an example of the summation of a number of calculated motion vectors in accordance with the present invention. As shown in FIG. 9, when a handle has four calculated motion vectors A, B, C, and D, a summed motion vector A+B+C+D can be graphically determined by forming a vector from the origin of vector A to the end of the last calculated motion vector D. In the example shown in FIGS. 8A–8C, handle 1 is the only handle to have two calculated motion vectors, vectors MV1 and MV3. In this case, the summed motion vector is equal to the sum of calculated and scaled motion vectors MV1 and MV3.

In addition, although FIG. 9 shows only a two-dimensional representation, the calculated and scaled motion vectors can be summed in 3D space in the same way. Thus, each time a calculated and scaled motion vector is added to a handle, the summed motion vector represents the sum of all of the calculated and scaled motion vectors that have been added to the handle.

Referring again to FIG. 7, after the calculated motion vector has been reversed and added to the second end, method 700 moves to step 744 to determine if all of the constraints have been processed. Method 700 also moves to step 744 from step 730 when the current and rest lengths are equal. When more constraints remain to be evaluated, method 700 returns to step 722 to select another constraint.

When all of the constraints have been evaluated, method 700 moves from step 744 to step 746. In step 746, for each handle, method 700 multiplies the handle weight of the handle times the summed motion vector of the handle to determine a final motion vector. As noted above, handles that have been moved by the user have a handle weight of 0.0 which, in turn, zeros out the summed motion vector and prevents these handles from being moved. In the example shown in FIGS. 8A–8C, the summed motion vector for handle 1 is multiplied times zero. As a result, handle 1 has a summed motion vector with a magnitude of zero.

After the handle weights of the handles have been multiplied times the summed motion vector of the handles to determine final motion vectors for the handles, method 700 moves to step 750 to determine new positions for each handle based on the current position of the handle and the final motion vector of the handle.

Next, method 700 moves to step 752 to determine if each constraint is equal to its original rest length (within a predetermined tolerance). If each constraint is not equal to its original rest length, method 700 moves to step 754 to determine if the process has been iterated a predetermined number of times. (Step 752 is optional, allowing the loop to end early when the constraint lengths have returned to their original rest lengths within the tolerance.) If the process has not been iterated a predetermined number of times, method 700 moves to step 720 to again set the summed motion vector of each handle to zero.

On the other hand, when each constraint is equal to its original rest length (within a predetermined tolerance) or method 700 has been iterated a predetermined number of times, method 700 moves to step 756 to redraw the constraints. FIG. 8C shows the final results once the constraints have returned to their original length.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A method of animating an object, the method comprising:
   constructing a rig by:
      forming a plurality of structures that represent a plurality of moving mass elements of the object so that each structure represents a moving mass element, each structure having a plurality of constraints, each constraint having ends and handles at the ends; and
      connecting the structures together to form the object so that to obtain a first type of movement between a first structure and a second structure, only one handle from the first structure and one handle from the second structure are connected together, and to obtain a second type of movement between the first and second structures, only two handles from the first structure and two handles from the second structure are connected together.

2. The method of claim 1 wherein constructing a rig includes:
   identifying the plurality of moving mass elements of the object to be animated; and
   determining a type of movement of each moving mass element.

3. The method of claim 1 and further comprising defining a position that is associated with each structure.

4. The method of claim 3 wherein the is a centroid.

5. The method of claim 1 wherein a third structure is defined by a plurality of triangles, and connected to the second structure.

6. The method of claim 1 and further comprising:
defining a plurality of connection points on the rig; and
associating geometrical shapes with the connection points.

7. The method of claim 1 wherein further comprising saving the second position, wherein the handle is not connected to the first structure or the third structure.

8. An apparatus for animating an object, the apparatus comprising:
means for constructing a rig, wherein the means for constructing a rig includes:
means for forming a plurality of structures that represent a plurality of moving mass elements of the object so that each structure represents a moving mass element, each structure having a plurality of constraints, each constraint having ends and a handle at each end; and
means for connecting the structures together to form the object so that to obtain a first type of movement between a first structure and a second structure, only one handle from the first structure and one handle from the second structure are connected together, and to obtain a second type of movement between the first and second structures, only two handles from the first structure and two handles from the second structure are connected together.

9. A method of determining a moved position of each of a plurality of handles that are associated with a plurality of constraints, each handle having a current position, a summed motion vector, and a handle weight, each constraint having a first handle, a second handle, a rest length, and a constraint length weight, the method comprising:
identifying a user moved handle;
setting the handle weight of the user moved handle to zero;
setting the summed motion vector of each handle to zero;
selecting a constraint;
calculating a current length of the constraint;
determining a difference between the current and rest lengths of the constraint;
determining if the current length of the constraint is less than the rest length of the constraint;
when the current length is less than the rest length, for the first handle of the constraint, determining a calculated motion vector along the constraint away from the constraint with a magnitude equal to a fraction of the difference between the current length and the rest length;
scaling the calculated motion vector by the length weight of the constraint to form a calculated and scaled motion vector;
adding the calculated and scaled motion vector to the summed motion vector of the first handle; and
reversing and adding the calculated and scaled motion vector to the summed motion vector of the second handle of the constraint.

10. The method of claim 9 and further comprising setting the handle weight of non-user moved handles to have a value from zero to one.

11. The method of claim 9 and further comprising:
determining if the current length of the constraint is greater than the rest length of the constraint; and
when the current length is greater than the rest length, for the first handle of the constraint, determining a calculated motion vector along the constraint towards the constraint with a magnitude equal to a fraction of the difference between the current length and the rest length.

12. The method of claim 11 and further comprising:
determining if the current length of the constraint is equal to the rest length of the constraint; and
when the current length is equal to the rest length or the calculated and scaled motion vector has been added to the summed motion vector of the second handle of the constraint, determining if all constraints have been processed.

13. The method of claim 12 and further comprising:
for each handle, multiplying the handle weight times the summed motion vector to determine a final motion vector, and move the handle based on the final motion vector;
determining new positions for each handle based on the handle's final motion vector; and
determining if each constraint has returned to the rest length within a predetermined tolerance.

14. An apparatus for determining a moved position of each of a plurality of handles that are associated with a plurality of constraints, each handle having a current position, a summed motion vector, and a handle weight, each constraint having a first handle, a second handle, a rest length, and a constraint length weight, the apparatus comprising:
means for identifying a user moved handle;
means for setting the handle weight of the user moved handle to zero;
means for setting the summed motion vector of each handle to zero;
means for selecting a constraint;
means for calculating a current length of the constraint;
means for determining a difference between the current and rest lengths of the constraint;
means for determining if the current length of the constraint is less than the rest length of the constraint;
when the current length is less, for the first handle of the constraint, means for determining a calculated motion vector along the constraint away from the constraint with a magnitude equal to a fraction of the difference between the current length and the rest length;
means for scaling the calculated motion vector by the length weight of the constraint to form a calculated and scaled motion vector;
means for adding the calculated and scaled motion vector to the summed motion vector of the first handle; and
means for reversing and adding the calculated and scaled motion vector to the summed motion vector of the second handle of the constraint.

15. A method of determining a moved position of a structure having handles and constraints, the method comprising:
detecting when a handle has been moved by a user;
selecting a constraint after a handle has moved by a user, the constraint having a first handle, a spaced apart second handle, and a rest length; and
determining if a current length of the constraint is less than, equal to, or greater than the rest length of the constraint, when the current length is greater than the rest length, for the first handle of the constraint, determining a calculated motion vector along the constraint towards the constraint with a magnitude equal to a fraction of the difference between the current length and the rest length.

16. The method of claim 15 and further comprising:
resetting a summed motion vector of each handle after a handle has been moved by the user; and
determining the current length of the constraint based on positions of the first and second handles after a handle has been moved by the user.

17. The method of claim 16 and further comprising:
scaling the calculated motion vector by a length weight of the constraint to form a calculated and scaled motion vector;
adding the calculated and scaled motion vector to the summed motion vector of the first handle after the summed motion vector of each handle has been reset; and
reversing and adding the calculated and scaled motion vector to the summed motion vector of the second handle of the constraint.

18. The method of claim 15 and further comprising when the current length is less than the rest length, for the first handle of the constraint, determining a calculated motion vector along the constraint away from the constraint with a magnitude equal to a fraction of a difference between the current length and the rest length.

19. The method of claim 15 and further comprising when the current length is equal to the rest length, determining if all constraints have been processed.

20. The method of animating an object, the method comprising: forming a rig that represents the object to be animated, the rig having a first structure and a second structure, the first structure representing a first element of the object, and having a first number of sticks, the second structure representing a second element of the object, and having a second number of sticks, a first stick of the first structure and a first stick of the second structure being connected to a first handle, a second stick of the first structure and a second stick of the second structure being connected to a second handle, the first and second handles being spaced apart, the first and second structures sharing a common stick connected to the first and second handles, first and second sticks of the first structure being movable with; and
wherein animating the object further comprises placing the object in a first position in 3D space; saving the first position; and moving a handle on the second structure to place the object in a second position.

21. The method of claim 20 wherein the rig further includes a third structure, the third structure representing a third element of the object, and having a third number of sticks, the first and second sticks of the first structure, a first stick of the third structure, and a second stick of the third structure being connected to a third handle, the first, second, and third handles being spaced apart, the first and second sticks of the first structure being movable with respect to the first and second sticks of the third structure about the third handle.

22. The method of claim 21 and further comprising identifying two or more elements of the object to be animated.

23. The method of claim 21 and furhter comprising determining and storing a length of each stick based on positions of the handles.

24. The method of claim 21 and further comprising determining and storing a length of the first stick of the first structure based on positions of the first and third handles.

* * * * *